Sept. 19, 1950 H. R. SHAW 2,522,967
VIDEO AMPLIFIER FEEDING CONSTANT BLACK LEVEL OUTPUT TO CATHODE-RAY TUBE
Filed May 21, 1948
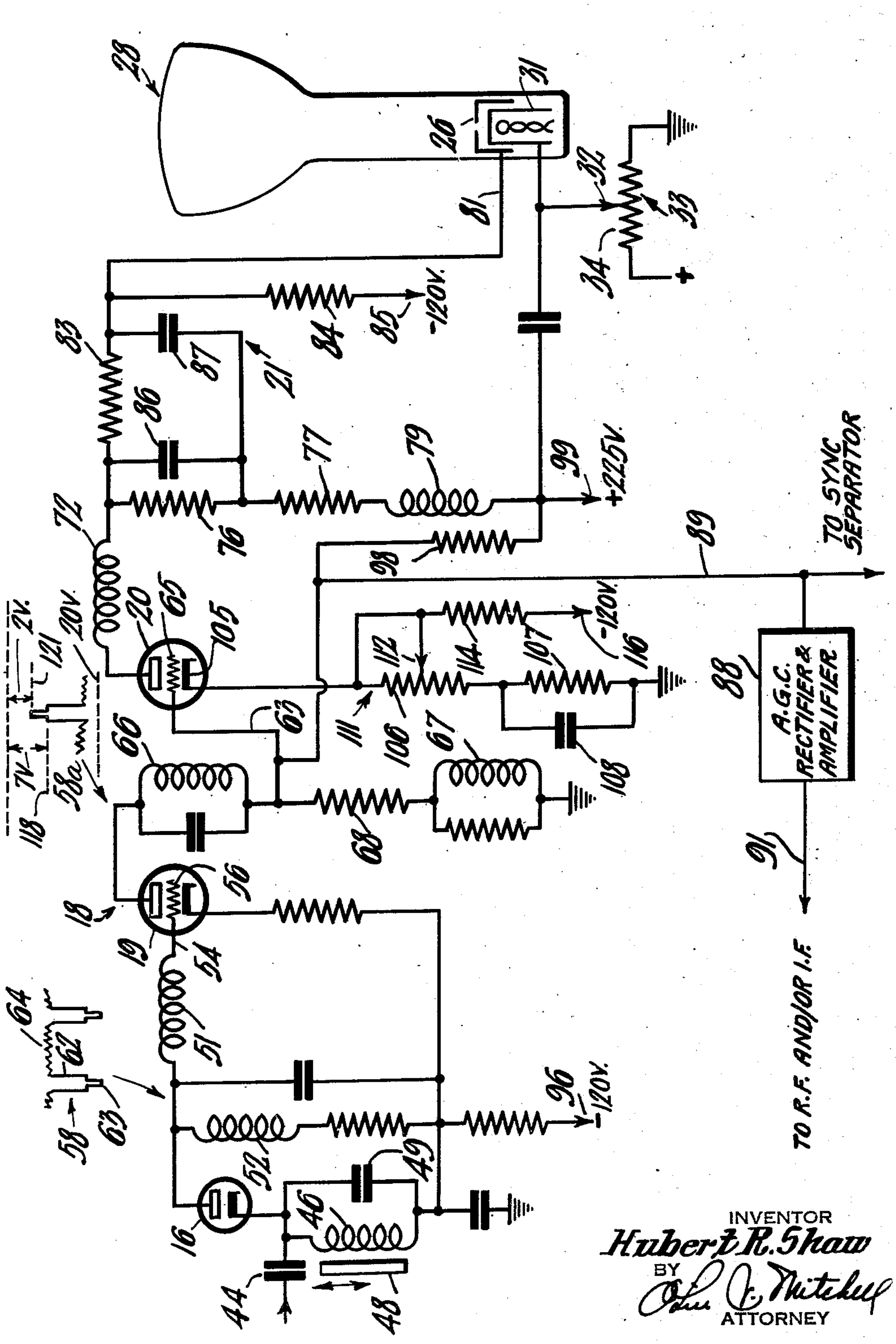
INVENTOR
Hubert R. Shaw
BY
[signature]
ATTORNEY Patented Sept. 19, 1950

2,522,967

UNITED STATES PATENT OFFICE 2,522,967

VIDEO AMPLIFIER FEEDING CONSTANT BLACK LEVEL OUTPUT TO CATHODE-RAY TUBE

Hubert R. Shaw, Drexel Hill, Pa., assignor to Radio Corporation of America, a corporation of Delaware Application May 21, 1948, Serial No. 28,377

2 Claims. (Cl. 178—7.5)

The present invention relates to television receivers and more particularly, but not necessarily exclusively, to improvements in the video amplifier of a television receiver whereby improved control of the operation of the image producing device is obtained.

The general aim or object of the present invention is to provide novel means for obtaining the desired contrast in a luminous image in a television receiver which is produced under control of a video signal. In accordance with one aspect of the invention the video amplifier, or at least one stage of the video amplifier, amplifies the D. C. (direct current) component of the video signal. To this end, the amplifier is physically or conductively coupled to the image producing device of the receiver. The video signal in apparatus embodying the invention is preferably maintained at a desired level in any suitable way, for example, by an automatic gain control device. Contrast in the produced image is then controlled in accordance with the invention by a control which is incorporated in the cathode circuit of the amplifier and effects the image producing device. This is achieved by controlling the effect of degeneration in a novel manner.

Another aim or object of the invention is to provide novel means for setting the black level or input level for the darkest part of a scene, object or piece of scanned subject matter.

A further aim or object of the invention, referred to above in broader terms, is to provide a novel control device for an amplifier which can be set so as to be ineffective at a selected signal level.

A further object is to provide, in a novel manner, for obtaining an image tube input signal having a range with a substantially fixed but adjustable limit.

Other objects and advantages of the present invention will, of course, become apparent and immediately suggest themselves to those skilled in the art to which the invention is directed from a reading of the following specification in connection with the accompanying drawing which shows diagrammatically, one suitable form of television apparatus embodying the invention.

Referring now to the drawing, there is illustrated a portion of a television receiver of a suitable kind, for example, of the superheterodyne type, comprising the usual first detector, a tunable oscillator, and an intermediate frequency (I. F.) amplifier, none of which are shown as they are not a part of the present invention. The signal receiving equipment, just mentioned, or its equivalent, provides a signal which is fed to a video demodulator or second detector 16 shown, by way of example, as a diode. The output of the second detector 16 is physically connected to a video amplifier 18, shown by way of example as comprising two physically connected tubes 19 and 20. The output of the tube 20 is applied by way of a physically connected coupling arrangement indicated generally by the reference character 21 to the control electrode 26 of an image producing cathode ray tube 28, shown schematically and by way of example. This image producing tube may be a "Kinescope" having appropriate image producing characteristics. The cathode 31 of the image producing tube 28 is connected to the movable contact 32 of a potentiometer 33. The resistor 34 of this potentiometer is connected between a reference point of the circuit, such as the ground, and a suitable point of positive potential on a voltage supply source (not shown).

The physically connected coupling arrangement 21 referred to above between the tube 20 and the control electrode of the image producing device is not a part of the present invention. Features of the coupling arrangement 21 are disclosed and claimed in a copending application for Letters Patent, Serial No. 28,302, filed May 21, 1948, by Clyde W. Hoyt, and entitled "Amplifier Coupling Circuit." A description of this coupling arrangement will be given at an appropriate point herein for the sake of completeness of disclosure.

The output from the I. F. amplifier (not shown) is delivered to the second detector 16 through a blocking condenser 44 and a tunable impedance, for example, the inductance 46 which is tunable by a movable magnetic core 48 of powdered iron or the like. A condenser 49 assists in tuning the inductance 46. It will be understood that a resonant circuit may exist and serve as the coupling means between the I. F. amplifier and the second detector 16. This resonant circuit, if it is present in the receiver which embodies this invention, includes the tunable inductance 46, the interelectrode capacity of the last stage tube (not shown) of the I. F. amplifier, and other circuit capacities including the second detector 16.

Series and shunt peaking coils 51 and 52 are arranged in the detector circuit from between which the demodulated output is applied by way of a physical or conductive connection 54 to the grid 56 of the tube 19. The output of the second detector being taken from the anode of the tube 16 provides that sync polarity is in the negative direction as shown conventionally by the wave-form 58 above the coil 51. The output signal from the second detector 16 includes blanking signals 62 and horizontal or line sync pulses 63, as well as the image signal portion 64 of a composite signal applied to the television receiver. It will be understood that at appropriate intervals vertical or field sync pulses (not shown) will occur.

The output of the tube 19 is directly coupled to the grid 62 of the tube 20 through a physical or conductive coupling 63. Series and shunt peaking coils 66 and 67, respectively, and a resistor 68 may be included in a coupling network between tube 19 and the grid 62 of the tube 20 if desirable or necessary in order to avoid loss of high frequency components of the signal. The signal appearing at the grid 62 of the tube 20 is substantially a replica of the plate-current wave of the tube 19 but is a voltage wave 58*a* in the positive direction.

The plate circuit of the tube 20 includes a series peaking coil 72, a pair of resistors 76 and 77, and a shunt peaking coil 79. Signal output from the tube 20 is of such polarity as to produce cut-off of the image tube 28 upon occurrence of blanking signals 62 and is applied to its grid 26 by way of a physical connection 81 including a resistor 83. A similar resistor 84 connects to a point 85 of negative potential.

Condensers 86 and 87 connected between the junction point of the resistors 76 and 77 and to the ends of the resistor 83 provide a coupling path for the A. C. (alternating current) video signal components.

To secure operation of the illustrated television receiver in the most effective manner for purposes of the invention, an automatic gain control (A. G. C.) system is provided. The A. G. C. system is shown conventionally at 88, and its input connection 89 is preferably in communication with a suitable point in the television apparatus so that the demodulated video signal is supplied to it. In the illustrative example, the connection 89 is taken from the output of the first stage tube 19 of the video amplifier 18. The control signal derived, or generated, in operation of the A. G. C. system appears in a connection 91, which is in suitable communication with the I. F. and R. F. amplifier, or either one. A suitable A. G. C. system is disclosed in the Martinelli Patent No. 2,296,393, granted September 22, 1942. A preferred A. G. C. system is disclosed in a copending application of Edwin L. Clark, Serial No. 613,772, filed August 31, 1945 and entitled "Automatic Gain Control System."

A portion of the demodulated composite video signal output is also taken from the video amplifier, for example, from the connection 89, and is supplied to a sync separator (not shown) which provides a separated sync signal suitable for operating appropriate components of the apparatus (not shown) for producing a scanning action of the cathode ray beam in the image tube 28.

The electrodes of the successive tubes in the amplifier stages are connected to a suitable voltage source (not shown) as indicated schematically on the drawing. Inasmuch as the amplifier 18, having a direct current interstage coupling, is physically or conductively coupled to the detector 16 and the image producing tube 28, the electrodes of the tubes are connected to points on the voltage source (not shown) having different values. The voltage values are assumed solely for illustrative purposes and convenience in describing the invention and its operation.

For example, the cathodes of the detector 16 and the amplifier tube 19 are indicated as being connected to a negative potential point 96 on the voltage supply source. Solely by way of example, this voltage is indicated as being −120 volts. The anode of the first stage amplifier tube 19 is connected to a resistor 98 which is indicated as being connected to a point 99 on the voltage supply source which is positive with respect to the connection of the cathodes of the first two tubes just mentioned. Solely by way of example, this voltage is indicated as being +225 v. However, a path to ground is provided from the anode of the tube 19 through the coils 66 and 67, and the resistor 68. The function of the resistor 98 is to apply a positive voltage on certain elements (not shown) of the A. G. C. apparatus 88 if desired. The inductor 67 is grounded and the anode of the tube 19 is positive with respect to its cathode since the latter is connected to a negative point on the power supply. The anode of the second stage tube 20 of the video amplifier is in communication with the point 99. The method of connecting voltage supply source and the like, and tube electrodes is by now well known, and it is believed that the diagrammatic indication given in the drawing will be sufficient to indicate to those skilled in the art the nature of the tube circuits employed.

The cathode 105 of the amplifier tube 20 is connected to ground through resistors 106 and 107. The latter is shunted by a condenser 108 to reduce its degeneration effect. The resistor 106 is the resistance element of a rheostat or potentiometer 111. The cathode 105 is also connected through a resistor 114 to a point 116 on the power supply which is indicated as being 120 volts negative.

The operation of the system, including the invention, will now be described. The instantaneous voltage on the grid 56 of the video amplifier tube 20 is, for example, −7 volts at the black level, indicated by the dotted line 118. The grid to cathode voltage is then for example, 7 volts so that the cathode is at ground potential on occurrence of the black signal level. The A. G. C. system maintains the black level by maintaining the instantaneous plate voltage of the first video amplifier on the tips of sync. The instantaneous plate voltage of the first video amplifier tube 19 may be about −2 volts as indicated by the dotted line 121. The resistor 114 is so selected that the instantaneous voltage at the cathode 105 of the tube 20 at the black level is equal to the voltage at the end of the resistor 106 which is more remote from the cathode 105. In the illustrative arrangement, this is substantially ground potential. At the black signal level, therefore, there is practically no current flow in the resistor 106 of the potentiometer 111. Since no current flows through the resistor 106 at the black lever, the voltage on the grid 26 of the image tube 28 at the black level is independent of the adjustment of the contact 112. For all other components of the video signal, the voltage developed across the resistor 106 is degenerative and the larger the value of 106, the smaller is the signal applied to the grid 21 of the image tube.

It may be pointed out by way of further description, that the control limit would be reached if the value of the control resistor 106 became infinite. In such case, only the resistor 114 would limit the amount of degeneration. In the circuit chosen for illustrative purposes, a greater range of contrast can be obtained by selecting a more negative point for the connection 116 of the resistor 114.

Solely by way of example and for the sake of convenience of description, suggested values for the more important resistors will be indicated. With the voltages suggested by way of example, in the foregoing, and employing a type 12AU7 tube for both stages of the amplifier 18, the resistor 106 may be in the neighborhood of 10,000 ohms. The resistor 114 may be in the neighborhood of 18,000 ohms.

What is claimed and desired to be secured by Letters Patent is:

1. In a television receiver, an amplifier having an input, an output, and a cathode circuit, means for applying operating voltages to said circuits, an image producing tube, control means for said image producing tube, means providing an output connection to said image producing tube from said amplifier, said amplifier cathode circuit including a variable resistor, a resistor connected from said cathode resistor to a point of negative potential, means to maintain a recurring signal level at the input of said amplifier, said resistor connected to said cathode resistor having the same voltage as the connection of said cathode resistor to the voltage reference point for the amplifier circuit upon occurrence of said recurring signal level.

2. In a television receiver, an amplifier having a control electrode circuit and a cathode circuit, means for applying operating voltages to said circuits, an image producing tube, a coupling connection from said amplifier to said image producing tube, said cathode circuit including a variable cathode resistor, said cathode resistor being connected to a potential reference point for said amplifier circuit, means to maintain a recurring signal level at the control electrode circuit of said amplifier, a resistor connected from the end of said cathode resistor opposite said potential reference point to a point negative with respect to said potential reference point, the end of said cathode resistor opposite said potential reference point having the same potential as said voltage reference point for the amplifier circuits upon occurrence of said recurring signal level.

HUBERT R. SHAW.

REFERENCES CITED

The following references are of record in the file of this patent:

UNITED STATES PATENTS

| Number | Name | Date |
|---|---|---|
| 2,226,259 | Richards et al. | Dec. 24, 1940 |
| 2,246,331 | White et al. | June 17, 1941 |
| 2,295,059 | Smyth | Sept. 8, 1942 |
| 2,358,428 | White | Sept. 19, 1944 |
| 2,430,699 | Berkoff | Nov. 11, 1947 |
| 2,443,864 | MacAuley | June 22, 1948 |

FOREIGN PATENTS

| Number | Country | Date |
|---|---|---|
| 112,360 | Sweden | July 8, 1936 |
| 505,899 | Great Britain | May 15, 1939 |
| 507,239 | Great Britain | June 6, 1939 |
| 868,885 | France | Jan. 19, 1942 |